No. 668,017. Patented Feb. 12, 1901.
A. C. PESSANO.
COUPLING FOR SHAFTS.
(Application filed Sept. 20, 1900.)
(No Model.)
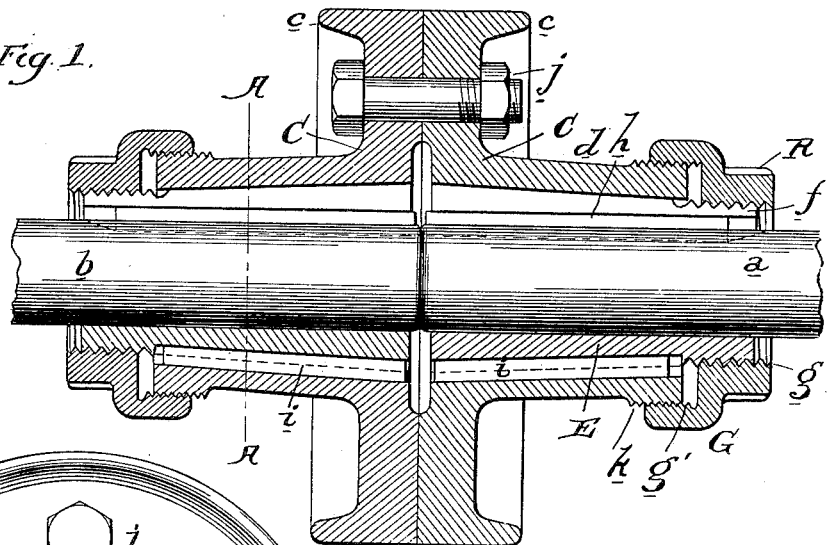
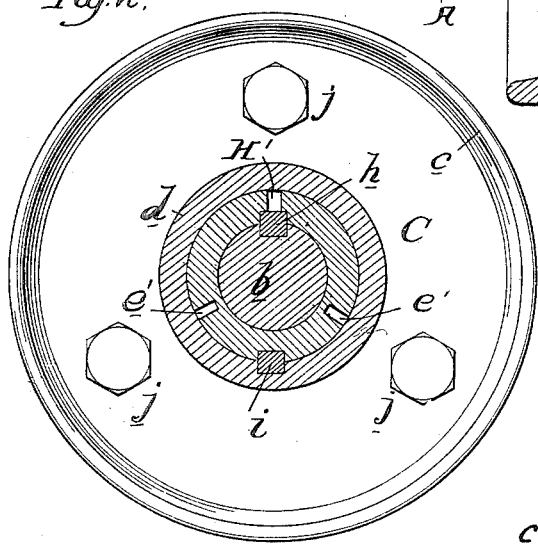
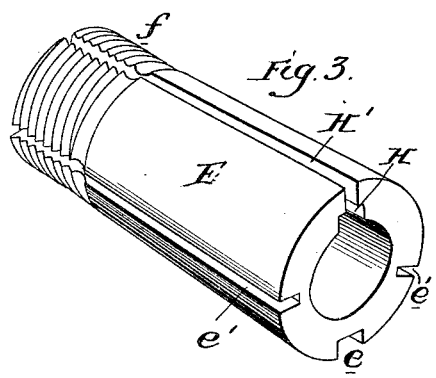
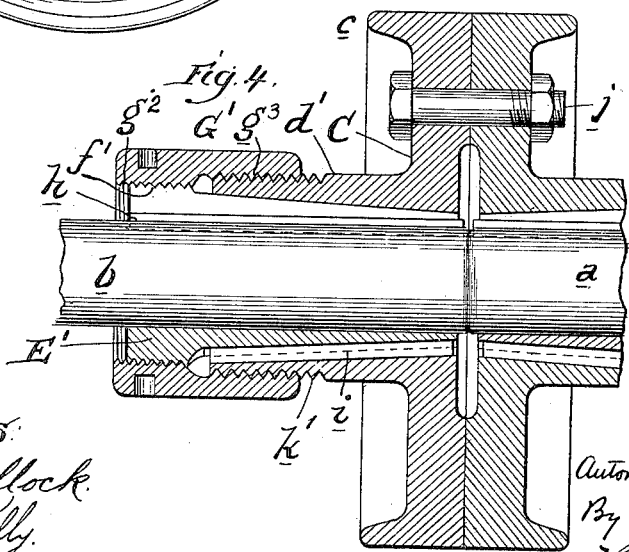
Witnesses:
H. B. Hallock.
P. M. Kelly.
Inventor:
Antonio C. Pessano
By [signature]
Atty.

ently, have invented an Im-
UNITED STATES PATENT OFFICE.

ANTONIO C. PESSANO, OF PHILADELPHIA, PENNSYLVANIA, ASSIGNOR TO THE GEORGE V. CRESSON COMPANY, OF PENNSYLVANIA.

COUPLING FOR SHAFTS.

SPECIFICATION forming part of Letters Patent No. 668,017, dated February 12, 1901.

Application filed September 20, 1900. Serial No. 30,551. (No model.)

*To all whom it may concern:*

Be it known that I, ANTONIO C. PESSANO, of the city and county of Philadelphia, in the State of Pennsylvania, have invented an Improvement in Couplings for Shafts, &c., of which the following is a specification.

My invention has reference to couplings for shafts, &c.; and it consists of certain improvements fully set forth in the following specification and shown in the accompanying drawings, which form a part thereof.

The object of my invention is to provide a suitable construction of coupling which shall be compact, simple, and capable of exerting an enormous clamping action with the expenditure of a limited manual force.

My object is, further, to so construct the coupling that a journeyman of ordinary intelligence can readily and properly apply the coupling to the shafts.

In carrying out my invention I provide two parts similar in all material respects and adapted to be respectively clamped to the ends of the shafts and bolted together, each of said parts consisting of a tapered split sleeve adapted to directly clamp the shaft and arranged to move longitudinally within a tapered socket-sleeve section and the two sleeves connected by a nut screwed upon them by means of threads of different pitch, whereby a powerful differential action is secured, as more fully set out hereinafter.

While this coupling is especially designed for coupling shafts, it or one section of it may be used for any other purpose to which it may be found adapted, whether in the form shown or a modification thereof.

My invention also comprehends details of construction, all of which will be better understood by reference to the drawings, in which—

Figure 1 is a longitudinal vertical sectional view of a coupling embodying my invention. Fig. 2 is a transverse sectional view of the same on the line A A of Fig. 1. Fig. 3 is a perspective view of one of the coupling-sleeves; and Fig. 4 is a sectional view similar to part of Fig. 1, showing a modification.

$a\ b$ are the two shafts or parts to be coupled.

C C are coupling parts provided with lateral socket-sleeves $d$, having internally-tapered walls.

E E are internal longitudinally-split clamping-sleeves arranged within the socket-sleeves $d$ and receiving the ends of the respective shafts $a\ b$. The clamping-sleeves E are tapered externally in a manner complementary to the internal taper of the socket-sleeves $d$ and are provided with externally-threaded extremities $f$, which extend beyond the ends of the sleeves $d$ and receive clamping-nuts G. These sleeves may also be each provided with longitudinal grooves $e'$ upon their outer surfaces to increase the spring action under compression. They are further each provided with a key-groove $e$ upon the outside and a key-channel H upon the inside and preferably at the split part H'. The shafts $a\ b$ are keyed to the sleeves E by suitable keys $h$, fitting into the channels H, and the sleeves E are correspondingly keyed to the sleeves $d$ by the keys $i$, fitting into the grooves $e$.

The nuts G are not only screwed upon the ends of the sleeves E, but are also screwed upon the ends of the tubular parts or sleeves $d$ of the coupling-sections C; but the threads $f$ upon the sleeves E and the threads $k$ upon the sleeves $d$ are of different pitch, one being coarse relatively to the other, and the corresponding internal threads $g$ and $g'$ on the nuts are similarly made of coarse and fine pitch, so that when the nuts are simultaneously screwed upon the threads $f\ k$ they will tend to advance faster upon the threads $f$ than upon threads $k$. This has the effect of drawing the tapered clamping-sleeves E outward under an enormous power due to the differential screw action. It will further be seen that when the full clamping action has taken place the nuts will be fully screwed upon the sleeves $d$ of the sections C.

Of course it is evident that the same result will be obtained by making the threads $f\ g$ of less pitch than threads $k\ g'$, as is shown at $f'\ g^2\ k'\ g^3$, Fig. 4; but in this case the nuts would have to be screwed outward to clamp the shafts. This applies to those cases where the taper of the sleeves E is outward, as in Fig. 1, but where the taper is inward, as in Fig. 4, then the last arrangement of the screw-threads will secure the clamping action by screwing the nuts upon the sleeves $d'$. In other words, referring to Fig. 1, where the taper of the sleeve E is outward, the threads $k$ should be finer than threads $f$ for the nuts to screw onto the sleeve $d$ in clamping the shaft; but in the case where the taper of sleeves E is inward, Fig. 4, then the threads $k'$ should be coarser than threads $f'$; but if it is desired that the nuts G′ shall screw outward in clamping the shafts then the reverse of the above statement holds good. In all cases, however, the power is exerted by a differential screw action, and hence an enormous clamping action is secured by the exertion of a small force on the nut. Any proportion desired between the pitches of the threads $k\,f$ or $k'\,f'$ may be used to suit the requirements.

In coupling the shafts together with construction of Fig. 1 the nuts G are first slipped on the shafts, the coupling-sections C C are slipped loosely over the ends of their respective shafts, and the intermediate split clamping-sleeves E are inserted and keyed to shafts respectively. The sections C C may then be turned a few times while the nuts G are being screwed upon the sleeves E to secure a sufficient number of threads engaged with the nut. Then the sleeves E are keyed to the sections C C. The nuts G are then screwed up tightly upon the threaded ends of the sleeves F and sections C, so as to draw the sleeves E outward. The tapered inner walls of the sleeves $d$ of sections C, acting on the tapered outer surface of the split sleeves E, clamp them firmly upon the shafts and to the sleeves $d$ of the coupling-sections. The coupling-sections are then butted together and bolted by bolts $i$, which are shielded by overhanging flanges $c$.

In the case of the coupling of Fig. 4 the sleeves E are placed on the shafts before the sections C, but otherwise the general arrangement and adjustment are the same as above described.

It will be observed that the adjustment or clamping action of each coupling member is entirely independent of the other, and consequently each may be adjusted independently to suit the diameter of its own shaft. Not only does this enable shafts of different diameters to be coupled together, but it affords a much better coupling for shafts commercially of the same diameter, since actual uniformity does not usually exist, and the slight variation usual though otherwise unimportant may affect the coupling. Such, however, is not the case with my coupling, in which each member is clamped upon its own shaft independently of the other. It also enables the shafts to be uncoupled with facility. By unfastening the bolts $j$ one shaft may be uncoupled and removed without disturbing the other shaft or its coupling member, and the shifting of the coupling sleeve and members longitudinally on the shafts, which is attended with considerable trouble and labor, is unnecessary.

The details of construction shown may be varied without departing from the invention.

What I claim as new, and desire to secure by Letters Patent, is as follows:

In a coupling for shafts, the combination of two parts each adapted to be attached to the end of one of the shafts, to be coupled and bolted together, each part consisting of an inner tapered clamping-sleeve split longitudinally adapted to clamp the shaft, and having its end provided with a screw-thread of one pitch, an outer internally-tapered socket-sleeve section adapted to the clamping-sleeve and also provided with a screw-thread of a different pitch, a key arranged in the split of the clamping-sleeve and extending into the socket-sleeve section, a key arranged between the clamping-sleeve and shaft on the diametrically opposite side to the split in the clamping-sleeve, and a nut having its hole formed of two diameters each of which is provided with screw-threads, said screw-threads being out of alinement and of radically different pitch and adapted to screw upon the respective threads of the two sleeves so as to produce a differential screw action when moving the clamping-sleeve into or out of the socket-section.

In testimony of which invention I have hereunto set my hand.

ANTONIO C. PESSANO.

Witnesses:
 H. E. NOSBAUM,
 C. H. WOLF, Jr.